US009957983B2

(12) United States Patent
Henck

(10) Patent No.: US 9,957,983 B2

(45) Date of Patent: *May 1, 2018

(54) PRESSURIZED ACTUATOR

(71) Applicant: TK Holdings Inc., Auburn Hills, MI (US)

(72) Inventor: Jeremy M. Henck, White Lake, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/474,559

(22) Filed: Mar. 30, 2017

(65) Prior Publication Data

US 2017/0204884 A1 Jul. 20, 2017

Related U.S. Application Data

(63) Continuation of application No. 14/458,112, filed on Aug. 12, 2014, now Pat. No. 9,611,185.

(51) Int. Cl.

*F15B 15/19* (2006.01)
*F15B 11/06* (2006.01)
*C09D 5/00* (2006.01)
*F15B 15/14* (2006.01)
*C06D 5/00* (2006.01)

(52) U.S. Cl.

CPC ................ *F15B 15/19* (2013.01); *C06D 5/00* (2013.01); *F15B 11/06* (2013.01); *F15B 15/1461* (2013.01)

(58) Field of Classification Search

CPC ...... F15B 11/06; F15B 15/1457; F15B 15/19; C06D 5/00

USPC .................................................. 102/530, 531

See application file for complete search history.

(56) References Cited

U.S. PATENT DOCUMENTS

| | | | | |
|---|---|---|---|---|
| 5,301,979 A * | 4/1994 | Allard | B60R 21/272 | 222/3 |
| 5,732,972 A * | 3/1998 | Johnson | B60R 21/272 | 102/531 |
| 5,768,885 A * | 6/1998 | Johnson | F02K 9/50 | 60/204 |
| 9,611,185 B2 | 4/2017 | Henck | | |
| 2001/0030254 A1* | 10/2001 | Stevens | B60R 22/4633 | 242/374 |
| 2004/0051284 A1* | 3/2004 | Parizat | B60R 21/264 | 280/736 |
| 2004/0099135 A1* | 5/2004 | Sandlin | F15B 7/001 | 91/167 R |
| 2006/0054016 A1* | 3/2006 | Davies | F15B 15/1409 | 92/109 |

* cited by examiner

*Primary Examiner* — Bret Hayes

(74) *Attorney, Agent, or Firm* — Meunier Carlin & Curfman LLC

(57) ABSTRACT

A linear actuator contains a housing having a first end and a second end. A hollow piston is positioned within the housing to slidably engage with an inner wall of the housing. A sealed gas chamber is formed within the hollow piston and contains stored gas for driving the piston upon activation of the actuator.

17 Claims, 2 Drawing Sheets

PRESSURIZED ACTUATOR

CROSS-REFERENCE TO RELATED APPLICATIONS

This application is a continuation application of U.S. Ser. No. 14/458,112 having a filing date of Aug. 12, 2014, now U.S. Pat. No. 9,611,185, which claims the benefit of U.S. Provisional Application Ser. No. 61/864,955, filed on Aug. 12, 2013, the teachings of each respective application herein incorporated by reference in their entirety.

TECHNICAL FIELD

The present invention relates generally to gas generating systems, and to an improved linear actuator.

BACKGROUND OF THE INVENTION

The present invention relates to vehicle occupant protection systems or other safety systems employing linear actuators to elevate a vehicle surface such as a hood, in the event of collision or impact with a pedestrian. Known linear actuators typically employ pyrotechnic means to activate a piston within an actuator. This increases the cost of manufacturing given that the gas generating composition must also be manufactured prior to insertion within the actuator. Further, shipping and handling may be more complex or complicated due to transportation and related regulatory requirements. Additionally, typical pyrotechnic compositions may exhibit untenable moisture sensitivity and increase the size of the actuator due to storage requirements within the actuator. It would therefore be an improvement to provide an alternative to the typical pyrotechnically actuated pistons.

SUMMARY OF THE INVENTION

A pyrotechnic actuator contains a housing having a first end and a second end. An ignition chamber is formed adjacent to the first end of the housing. The initiator is fixed at the first end in a known manner. A hollow piston or tube is positioned within the housing and substantially coextensive therewith, the piston having a third end and a fourth end, whereby the third end is proximate to the first end of the housing and the fourth end is proximate to the second end, the piston extending from the first end to the second end prior to activation of the actuator. A stored gas is contained within a hollow piston rod attached to the piston. A burst shim or seal may be fixed across a passage formed at the third end of the piston assembly, either external or internal of the piston rod or tube, thereby sealing the gas within the piston rod. Upon activation of the actuator, the initiator ruptures the burst shim, whereby gas exits the piston and concurrently drives the piston forward in a direction opposite of the gas release. In this manner the piston is propelled from the first end of the housing to the second end of the housing.

In sum, a piston assembly of the present invention contains a housing having a first end and a second end. A hollow piston rod is contained within the housing, wherein the piston rod has a third end and a fourth end, the third end proximate to the first end and the fourth end proximate to the second end. A sealed gas chamber filled with stored gas is formed within the hollow piston rod and substantially constitutes the interior of the hollow piston rod. An initiator is fixed at the first end near the third end of the piston rod, and is used to burst a seal on the piston rod thereby liberating the stored gas from the hollow chamber and propelling the piston rod from the first end to the second end of the housing.

A piston fixed to the piston rod may be defined by a first flange formed on the third end, the first flange having a first outer diameter slidably engaged with an inner wall or diameter of the housing upon activation of the actuator. A second flange may be formed on the third end, the second flange positioned closer to the initiator and the second flange having a second outer diameter smaller than the first outer diameter of the first flange. By virtue of the different sizes of the first and second diameters, an annular conduit is formed between the inner diameter or inner wall of the housing and the second flange. Gas may therefore be shunted through the conduit onto a surface area formed in an annular plenum created between the first and second flanges and an annular wall formed therebetween, thereby driving the piston assembly through the housing.

DETAILED DESCRIPTION OF THE INVENTION

Figure 1:
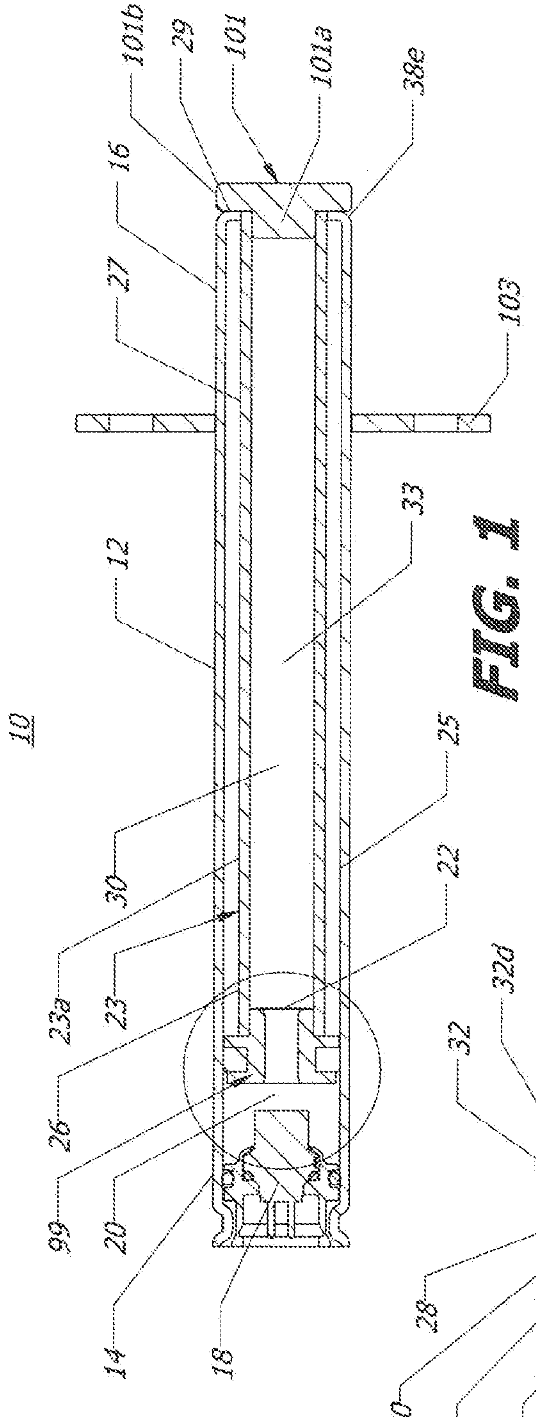
FIG. 1 illustrates a pressurized pyrotechnic actuator in accordance with the present invention.
Figure 1A:
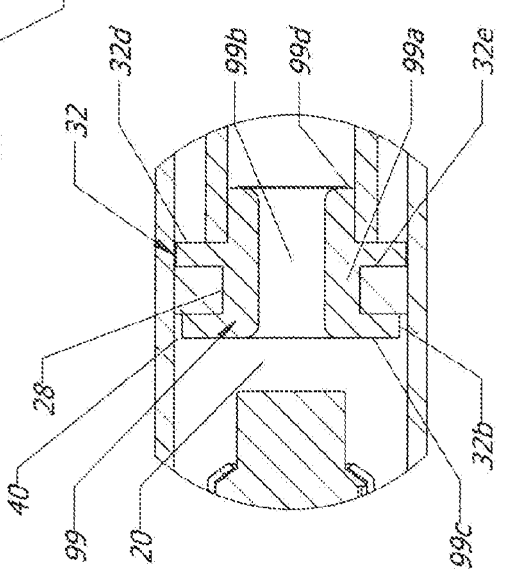
FIG. 1A illustrates a macro view of the ignition chamber and burst shim interface, as identified by region "A" in FIG. 1.

As shown in a first embodiment of FIG. 1, a linear actuator 10 contains a housing 12. The housing 12 contains a first end 14 and a second end 16. An initiator or igniter 18 is fixed within the first end 14 in a known manner, such as by a body bore seal for example. An ignition chamber 20 is formed proximate to the igniter 18. A burst shim or seal 22 may be fixed adjacent the chamber 20 thereby retaining the pressurized gas within the piston rod interior 30. A tube or hollow piston rod 23 is contained within the housing 12 and extends from immediately adjacent the ignition chamber 20 to the second end 16 (prior to activation of the actuator). It will be appreciated that a portion 32 of a piston first end 26 may therefore have an outer diameter substantially equivalent to the inner diameter of the housing 12 as defined by the inner wall 25. An outer wall 23*a* of the piston 23 may be almost coextensive with the length of the housing 12. The portion or first piston flange 32 of the piston 23 is flushly fit against the annular inner wall 25 of the body 12, thereby sealing the flange 32 against the inner wall of the housing 12. First piston flange 32 has a first outer diameter 37 that slidably engages with the inner wall 25 of the housing 12. A front surface 32*d* is formed integral to first flange 32 and provides a stop of the forward action of the piston rod assembly 23 when actuator 10 is activated. An annular plenum 28 is formed within the first piston end 26, that as explained below, provides an annular gaseous force against a back portion 32*e* (integrally formed with the first piston flange 32), upon activation of the actuator 10.

A second piston flange 32*b* is formed on the first end 26 closer to the igniter 18 than the first flange 32, whereby the first flange 32 and the second flange 32*b* sandwich the plenum 28 formed therebetween. A surface area 32*e* is defined within the plenum 40 and operably communicates with the stored gas 33 once the actuator is activated, thereby driving the piston rod 23 through the housing 12. Second piston flange 32*b* has a relatively and slightly smaller second outer diameter 39 as compared to the first outer diameter of the first piston flange 32. By virtue thereof, an annular gap or plenum 40 is formed between the outer annular surface of the second flange 32*b* and the inner wall 25 of the housing 12, thereby permitting gas to flow between the second flange 32*b* and the inner wall 25 of the housing 12 upon activation of the actuator 10. As elaborated on below, as gas flows into the plenum 40, the piston rod assembly 23 is driven forward as the gas pressure increases and exerts a force against the surface area or back portion 32*e* of the first flange 32.

A piston, cap, or plug 99 is fixed within the piston rod assembly first end 26, and contains and is generally defined by the first flange 32, the second flange 32*b,* and a core wall 99*a* integrally formed with the first and second flanges. An annular gas passage 99*b* is defined within the core wall 99*a* and extends from a first end 99*c* through the piston 99 into the interior 30 of the piston rod assembly 23. The first annular end 99*c* is formed in the cap 99 proximate to the igniter and a second annular end 99*d* is formed in the cap 99 closer to the second end 16 of the housing 12. Upon activation of the actuator 10, the annular passage 99*b* provides an exit or conduit for gas to expand out of interior 30 into chamber 20, through gap 40 and into plenum 28. The burst shim or seal 22 may be fixed to either first or second annular end 99*c*/99*d,* or both.

A mount 103 may be positioned and fixed about the periphery of housing 12 for mounting to a vehicle (not shown).

A second piston or cap 101 is welded, press-fit, or otherwise joined to and at least partially within a second piston end 27 thereby sealing the piston rod or tube 23 at the end 27. A junction 29 is formed at a point where a rounded portion of the housing 12 and the outer wall 23*a* of the piston 23 meet. A portion 101*a* of the piston cap 101 extends into the interior 30 at the second piston end 27. A second portion 101*b* of the piston cap 101 preferably has a greater diameter than portion 101*a,* that may be substantially equivalent to the diameter of the housing 12.

When manufacturing the actuator 10, stored gas 33 such as argon, nitrogen, helium, other inert gases, and combinations thereof, may be provided by preferably welding a "plug" bore seal assembly 99/22 under pressure. The piston rod would be filled with pressurized gas and then plug bore seal assembly 99, already having the burst shim or seal 22 installed, could be welded under pressure to the tube or piston rod 23. The welding pressure would of course not exceed the burst pressure of the shim 22. Accordingly, the tube or piston interior 30 may be filled under pressurized conditions wherein the burst shim 22 is fixed to the end 99*c* or 99*d,* respectively, and then the initiator 18 is fixed to the end 14 of housing 12 in a known manner, under ambient pressure conditions if desired. The piston rod 23 and the housing 12 may be metal-formed as known in the art, cold-drawn for example; on the other hand, if the piston 23 and/or housing 12 is polymeric or plastic, the parts may be injection-molded or otherwise formed as known in the art. The initiator or igniter 18 may be any state-of-the-art initiator as known in the art. The gas may be provided by known suppliers such as Praxair, for example. In general, the various constituents of the actuator 10 are made as known in the art, but in a novel configuration as described above.

In operation, a sensor (not shown) built as known in the art senses a predetermined event, such as impending impact of an associated vehicle hood by a pedestrian, and thereby triggers the activation of the actuator 10 by providing an electronic stimulus to the igniter 18 for example. As the igniter 18 is activated, the ignition forces such as pressure and perhaps heat that is provided by the igniter 18 provide a force great enough to rupture the burst shim 22. Upon rupture of the burst shim, stored gas quickly exits gas passage 99*b* and enters chamber 20 and then plenum 28 as it passes through annular gap 40. The annular burst of gaseous pressure provided in the annular plenum 28 drives the piston rod assembly 23 forward as the gaseous force is biased against rear portion 32*e* of first flange 32. As the piston rod assembly 23 is driven forward, front portion or piston stop 32*d* arrests and terminates the movement of the piston rod assembly 23 once piston stop 32*d* interfaces with or slams against the rounded housing wall 38*e* at junction 29.

Various aspects of the present actuator 10 may be modified to tailor the performance of the actuator 10. For example, the conduit or gas passage 99*b* may be increased or decreased in diameter to affect a change in the speed of the gas as it exits the interior 30 of piston 23 and travels into chamber 20. In the same way, the annular gap 40 may be increased or decreased depending on desired gas flow design criteria as it flows into plenum 28. Yet further, plenum 28 may be optimized by increasing or decreasing the volume of plenum 28 to affect a desired increase or decrease in the speed of the piston rod assembly 23. The type of gas used and the design pressure within the piston rod assembly 23 may also be modified as desired.

Figure 2:
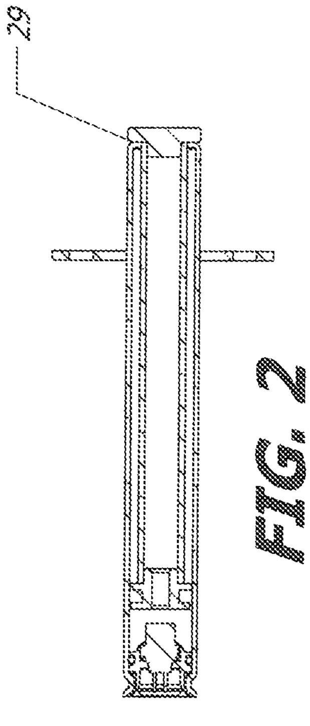
FIG. 2 illustrates a pre-activated pyrotechnic actuator in accordance with the present invention.
Figure 3:
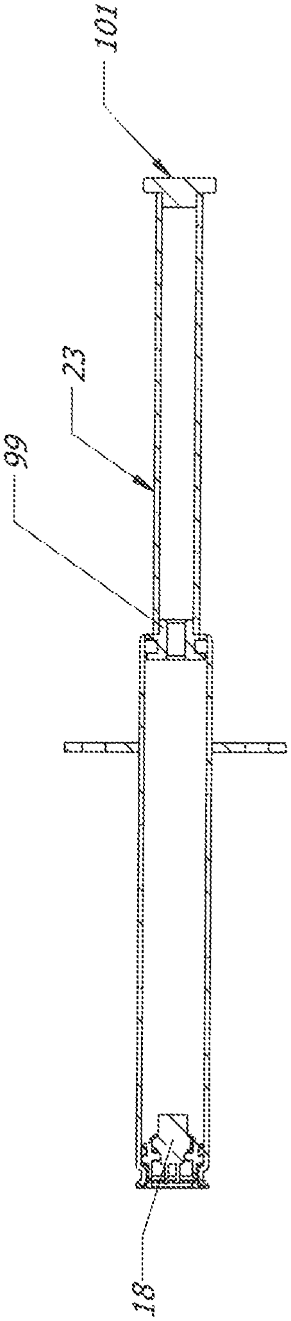
FIG. 3 illustrates a pyrotechnic actuator of FIGS. 1 and 2, after activation of the actuator.

If desired, housing 12 may be perforated or contain gas exit apertures 12*a* (not shown) that may provide vents for the gas released into the housing 12 from the interior 30 of piston rod assembly 23. Accordingly, if gas exit apertures 12*a* are formed closer to end 16, the gas within housing 12 will not be vented until sealing first flange 32 passes the gas exit aperture 12*a.* As the first flange 32 passes the gas exit apertures 12*a,* the gas within housing 12 is permitted to vent thereby releasing the hood lift provided by the extended piston as shown in FIG. 3 for example. FIGS. 2 and 3 as shown, however, illustrate a non-vented or non-perforated housing 12, wherein gas is simply retained within housing 12 to retain the hood elevation or hood lift provided upon activation of actuator 10.

In operation, the present pressurized linear actuator 10 is activated when the igniter 18 receives a signal from a vehicle computer algorithm that responds to impact, deceleration, or other known appropriate sensor. As the pedestrian makes contact with the associated vehicle and/or vehicle hood, the algorithm senses the impact and signals the igniter to activate. Upon activation, heat and pressure products from the igniter 18 burst the burst shim 22 thereby releasing the pressurized gas and driving the piston first end 26 and piston rod 23 across the length of the body 12 to the second end 16. As the piston 99 and piston 23 are propelled within and along the length of the housing 12, the second end 16, larger in diameter than the rest of the piston, functions to elevate or raise the hood to mitigate the harm or injury to the pedestrian in contact therewith.

Again, it will be appreciated that the present actuator may be largely formed or manufactured as known in the art. For example, U.S. Pat. No. 6,568,184 generally teaches the basic structure of the first embodiment, and is herein incorporated by reference in its entirety. The body or housing 12 may be drawn or otherwise metal formed as known in the art. One difference would be that the present invention is charged with gas whereas the referenced known actuator is a pyrotechnic actuator. Additionally, it will be appreciated that gases known to be suitable for use in hybrid or stored gas inflators for airbags, are equally useful here. As such, the gas may be any suitable inert gas such as argon, nitrogen, and mixtures thereof.

It should further be understood that the preceding is merely a detailed description of various embodiments of this invention and that numerous changes to the disclosed embodiments can be made in accordance with the disclosure herein without departing from the scope of the invention. The preceding description, therefore, is not meant to limit the scope of the invention. Rather, the scope of the invention is to be determined by the various equivalents as would be appreciated by those of ordinary skill in the art.

What is claimed is:

1. A linear actuator comprising:
- a housing comprising a first end and a second end;
- a hollow piston rod comprising a third end and a fourth end, wherein the third end is disposed within said housing and is proximate to the first end prior to activation of the linear actuator, and the fourth end is proximate to the second end prior to activation of the linear actuator, said hollow piston rod further comprising an inner wall;
- a sealed gas chamber defined by the inner wall of the hollow piston rod;
- a pressurized gas contained within the sealed gas chamber prior to activation of the actuator, and
- a burst shim coupled to the hollow piston rod at the third end, for sealing the sealed gas chamber.

2. The linear actuator of claim 1 further comprising:
- an initiator fixed at the first end and proximate to the third end for bursting the burst shim and causing the release of the pressurized gas upon activation of the actuator to thereby drive the piston rod.

3. The linear actuator of claim 1 further comprising:
- an inner wall formed by the housing, the inner wall of the housing having an inner diameter;
- a first flange extending radially from the third end, the first flange having a first outer diameter slidably engaged with the inner diameter;
- a second flange extending radially from the third end, the second flange positioned closer to the initiator than the first flange and the second flange having a second outer diameter smaller than the first outer diameter, wherein an annular conduit is formed between the inner diameter and the second flange.

4. The linear actuator of claim 3 further comprising:
- an outer wall formed between the first flange and the second flange; and
- a plenum defined by the first flange and the second flange and the outer wall.

5. The linear actuator of claim 3 wherein a plug is fixed to the third end and comprises the first and second flanges, and the burst shim is coupled to the plug.

6. A linear actuator comprising:
- a housing having a first end, a second end, and an inner wall having an inner diameter;
- a hollow piston rod, the hollow piston rod defining an interior and having a third end and a fourth end, the third end disposed within the housing and proximate to the first end and the fourth end proximate to the second end prior to activation of the linear actuator;
- a sealed gas chamber defined by the interior;
- a pressurized gas contained within the sealed gas chamber;
- a first flange extending radially from the third end, the first flange having a first outer diameter slidably engaged with the inner wall;
- a second flange extending radially from the third end, the second flange having a second outer diameter smaller than the first outer diameter; and
- a conduit defined between the inner diameter and the second flange for passage of the pressurized gas upon activation of the linear actuator.

7. The linear actuator of claim 6 wherein a plug is fixed to the third end and comprises the first and second flanges.

8. The linear actuator of claim 7 further comprising a burst shim fixed across the plug prior to activation of the linear actuator.

9. The linear actuator of claim 6 further comprising an initiator fixed at the first end and proximate the third end for causing the release of the pressurized gas upon actuation of the actuator.

10. The linear actuator of claim 6 further comprising:
- an outer wall formed between the first flange and the second flange; and
- a plenum defined by the first flange and the second flange and the outer wall.

11. The linear actuator of claim 6 further comprising a burst shim fixed to the hollow piston rod at the third end prior to activation of the linear actuator.

12. A linear actuator comprising:
- a housing;
- a hollow piston rod defining an interior, the hollow piston rod disposed within the housing prior to activation of the actuator;
- a sealed gas chamber defined by the interior of the hollow piston rod;
- a pressurized gas contained within the sealed gas chamber prior to activation of the actuator; and
- a plug fixed on the hollow piston rod, wherein a portion of a surface area of the plug is in operable communication with the pressurized gas upon activation of the linear actuator to drive the hollow piston rod.

13. The linear actuator of claim 12 wherein the housing comprises a first end and a second end; and wherein the hollow piston rod comprises a third end and a fourth end, the third end proximate to the first end and the fourth end proximate to the second end prior to activation of the actuator.

14. The linear actuator of claim 13 further comprising:
- an initiator fixed at the first end and proximate to the third end for causing the release of the pressurized gas upon activation of the actuator to thereby drive the piston rod.

15. The linear actuator of claim 12 further comprising a burst shim fixed across the plug prior to activation of the linear actuator.

16. The linear actuator of claim 12 further comprising:
- an inner wall formed by the housing, the inner wall having an inner diameter;
- a first flange extending radially from the plug, the first flange having a first outer diameter slidably engaged with the inner diameter;
- a second flange extending radially from the plug, the second flange positioned closer to the initiator and the second flange having a second outer diameter smaller than the first outer diameter; and
- a conduit formed between the inner diameter and the second flange.

17. The linear actuator of claim 16 further comprising:

an outer wall formed between the first flange and the second flange; and a plenum formed between the first flange and the second flange and the outer wall.

* * * * *